Figure 1:
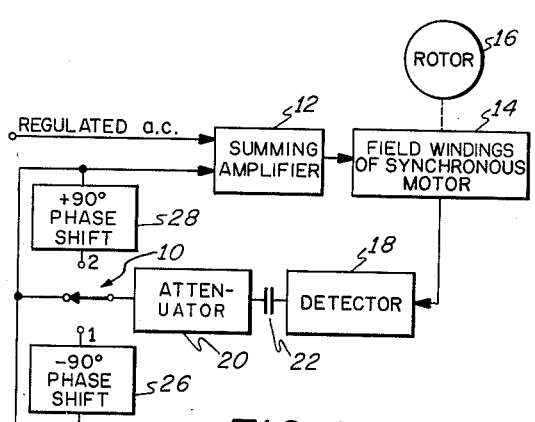

March 1, 1966

D. J. AMBERGER 3,238,432

MOTOR CONTROL APPARATUS

Filed March 9, 1962

3 Sheets-Sheet 1

INVENTOR.
DONALD J. AMBERGER
BY

ATTORNEY

March 1, 1966  D. J. AMBERGER  3,238,432
MOTOR CONTROL APPARATUS

Filed March 9, 1962  3 Sheets-Sheet 2

INVENTOR.
DONALD J. AMBERGER
BY
                    *[signature]*
        ATTORNEY United States Patent Office 3,238,432
Patented Mar. 1, 1966

3,238,432
MOTOR CONTROL APPARATUS
Donald J. Amberger, Hauppauge, N.Y., assignor to Sperry Rand Corporation, Great Neck, N.Y., a corporation of Delaware
Filed Mar. 9, 1962, Ser. No. 178,627
10 Claims. (Cl. 318—175)

This invention relates in general to motor control apparatus and in particular to apparatus that prevents the field winding current of a synchronous motor from varying when undamped oscillatory forces are applied to the rotor of the motor. In two forms of the invention, the current is held constant by so exciting the field windings that the oscillatory forces are cancelled; in a third form of the invention, the current is held constant, not by cancelling such oscillatory forces, but by forcing the field winding excitation to vary simultaneously with and in phase with such oscillatory forces, thereby preventing any modulation of the field winding current.

A synchronous motor, e.g. a hysteresis motor, when running at synchronous speed, has a particular angular relationship between a rotating magnetic vector produced by its field windings and a rotating magnetic vector in its rotor; when the angle between the two vectors is small, the field windings draw less current (because of substantial field winding impedance) than such angle is large (i.e. when the field windings have little impedance). With a mechanical load secured to and driven by the rotor, the field winding current fluctuates periodically when the load oscillates, i.e. hunts, in undamped fashion, this being because the load forces the aforesaid angular relationship of vectors to vary periodically.

Floated gyroscope apparatus, e.g. the apparatus shown in the drawing of application Serial No. 458,146, filed May 25, 1965, by Eugene S. Rocks and Harry J. Smith and assigned to the present assignee, require the buoying fluids to have as close to constant temperatures as possible since temperature changes affect fluid buoyancy characteristics. With the "float," i.e. the structure containing the gyro itself, of such apparatus evacuated (which is as it usually is) and the gyro driven by a synchronous motor, mechanical disturbances applied to the gyro cause it to vibrate in substantially undamped manner (there being practically no damping provided by its vacuous environment) and the motor field winding impedances to change accordingly. As a result, the current drawn by the motor varies and causes undesirably the fluid temperature to vary also.

Apparatus employing the invention senses and converts changes in the alternating current passing through a gyro motor field winding to a representative negative feedback voltage which operates to cancel the motor excitation. Prior to its application, the feedback voltage is attenuated, e.g. by periodic interruption or by being reduced in amplitude, to assure maintenance of synchronous speed by the motor; without such attenuation, for example, the motor excitation will be completely and continually cancelled when power is applied to the motor.

A principal object of the invention is to provide apparatus that prevents modulation of the alternating current drawn by a synchronous motor.

Another object of the invention is to provide apparatus that damps oscillations of a load driven by a synchronous motor.

Another object of the invention is to provide motor control apparatus that prevents undamped oscillations of a load driven by a synchronous motor while keeping the voltage applied to the motor substantially constant.

Still another object of the invention is to provide an amplifier having extreme stability with respect to its gain and the phase shift that it causes its applied signals.

Another object of the invention is to provide apparatus for checking the bearings of a synchronous motor.

Yet another object of the invention is to provide floated gyroscope apparatus employing a synchronous motor and having a fluid unsubjected to temperature changes caused by the current drawn by the motor.

Figure 2:
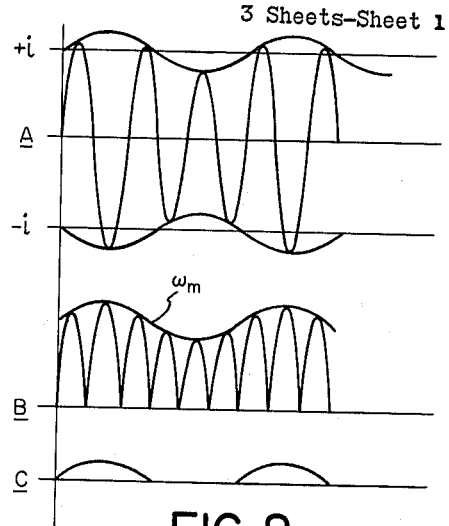
Figure 4:
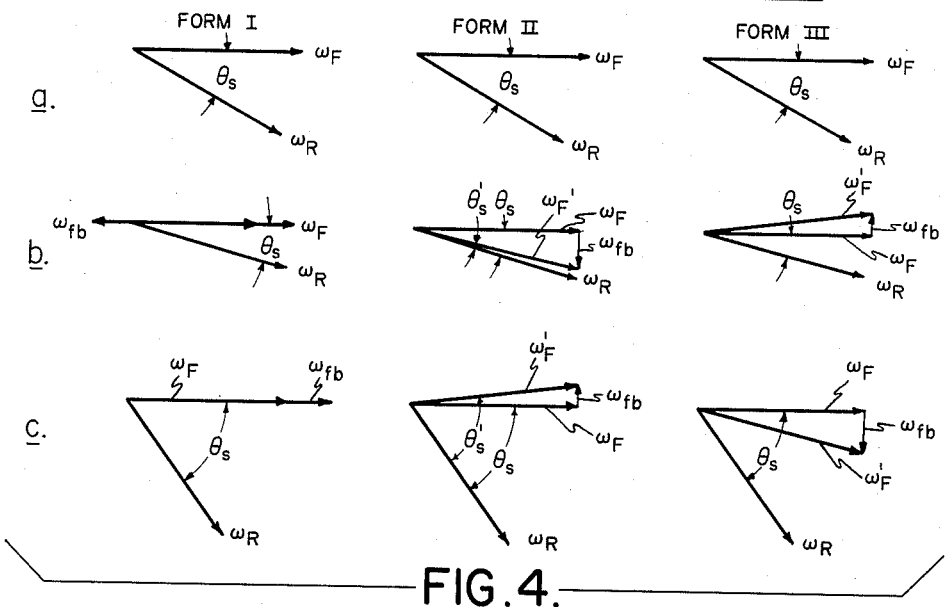
Figure 3:
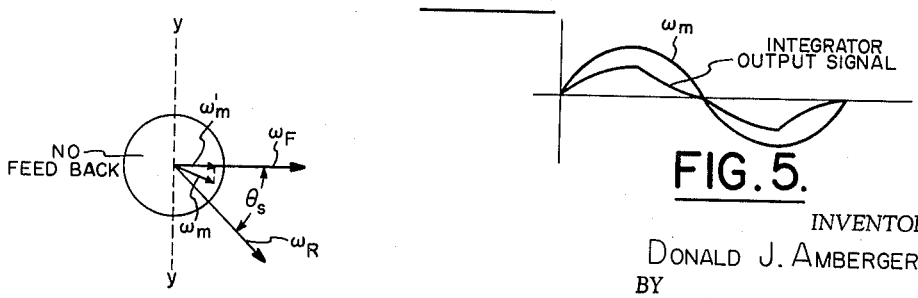
Figure 5:
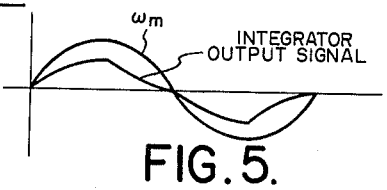
Figure 6:
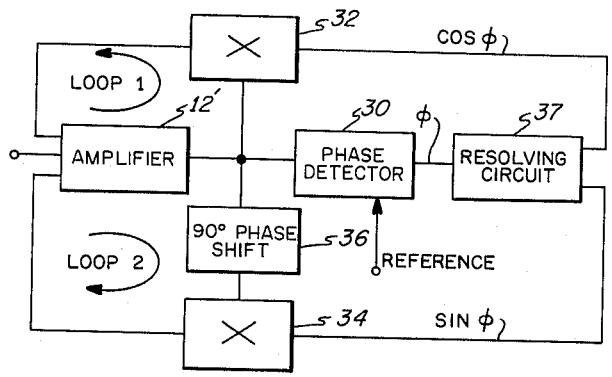
Figure 7:
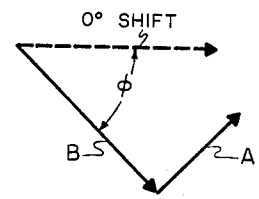
Figure 8:
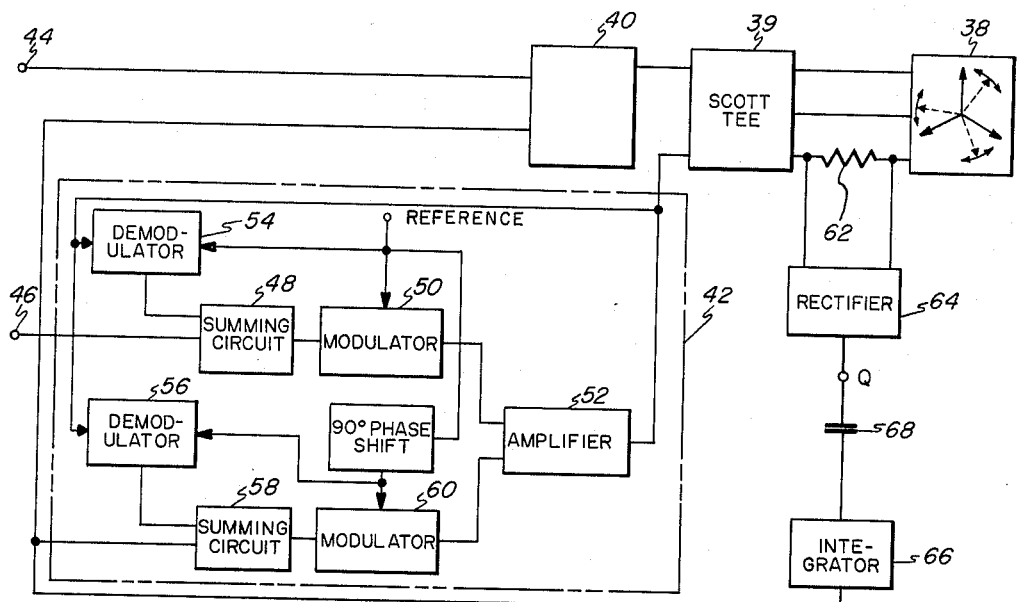
Figure 9:
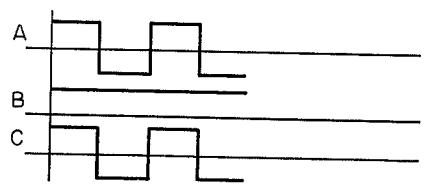
Figure 10:
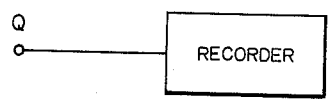
Figure 11:
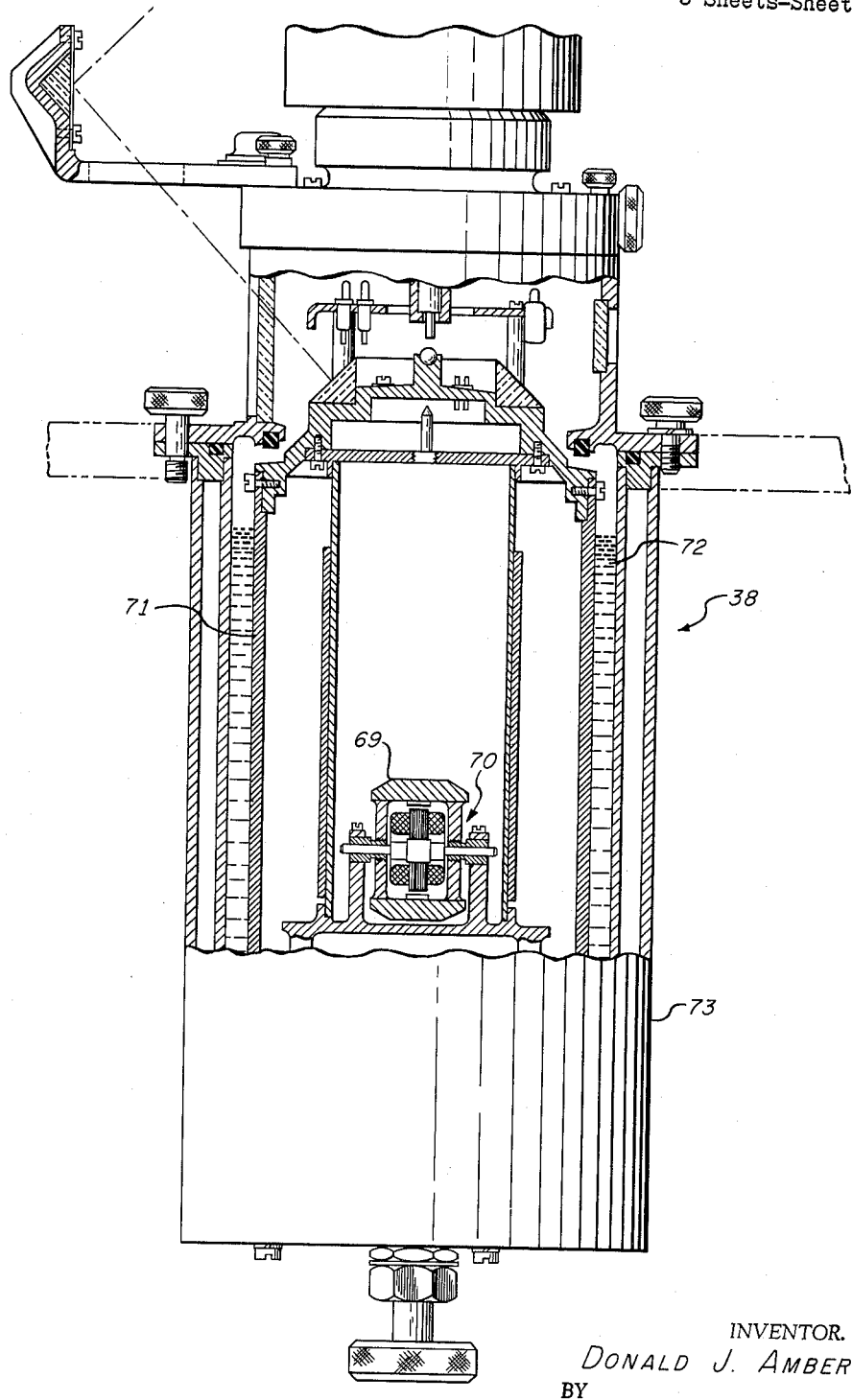

The invention will be described with reference to the figures wherein:

FIG. 1 is a block diagram of apparatus that provides three different forms of the invention, FIGS. 2 and 3 are diagrams useful in describing a simple form of the invention, FIG. 4 shows diagrams for comparing three forms of the invention, FIG. 5 is a diagram useful in describing a presently preferred form of the invention, FIG. 6 is a block diagram of an amplifier circuit having good gain and phase shift stabilities, FIG. 7 is a diagram useful in describing the apparatus of FIG. 6, FIG. 8 is a block diagram of floated gyroscope apparatus embodying the present invention, FIG. 9 shows diagrams useful in describing the apparatus of FIG. 8, FIG. 10 shows a device which when properly connected to the apparatus of FIG. 8 provides a check on the bearings that support the gyroscope, and FIG. 11 is an elevation view of a floated gyro structure in partial vertical section.

Referring to FIG. 1, a switch 10 provides an easy-to-understand form of the invention when in the position shown and two other forms when in its positions 1 and 2. A summing amplifier 12, receiving a regulated A.C. excitation signal, applies its output signal to the field windings 14 of a synchronous motor, the rotor 16 of which is adapted to be driven synchronously by a rotating magnetic field produced by current flowing in the field windings 14. A detector 18 (a form of which is described later), adapted to detect current flowing in the field windings 14, produces a D.C. voltage proportional to such current, any A.C. component of which being applied through a D.C. blocking capacitor 22 to an attenuator 20. The attenuator output signal is then applied through the switch 10 to the summing amplifier 12.

To understand the operation of the apparatus of FIG. 1, assume that the rotor 16 is subjected to a force which makes it hunt, i.e. periodically speed up and slow down, thereby causing the impedances of the field windings 14 to increase and decrease respectively as mentioned earlier. As a result, the field winding currents become modulated as shown in FIG. 2A and the detector 18 produces a varying D.C. signal (see FIG. 2B), the component $\omega_M$ of which is alone applied to the attenuator 20. With the attenuator 20 attenuating by periodically blocking its applied signal $\omega_M$, i.e. the attenuator is a half wave rectifier, feedback to the summing amplifier 12 is as shown in FIG. 2C. With such periodic feedback, the summing amplifier output signal is periodically diminished in amplitude, thereby cancelling the tendency of the rotor to move in one particular direction, e.g. every time the rotor tends to accelerate the output signal from the summing amplifier 12 diminishes. Hence, the operation of the apparatus of FIG. 1 may be likened to a swinging pendulum which passes periodically from a damping medium to a medium affording no damping.

FIG. 3 shows vectorially the aforedescribed operation: $\omega_F$ and $\omega_R$ respectively represent the rotating magnetic field and rotor vectors, the angle $\theta_S$ being the angle between the vectors and being proportional to the torque produced by the motor. When the angle $\theta_S$ varies, i.e. when the vector $\omega_R$ accelerates and decelerates with respect to the vector $\omega_F$, the vector $\omega_M$ is produced, this vector having a rotational speed substantially less than the speed at which the vectors $\omega_F$ and $\omega_R$ rotate. When the vector $\omega_M$ is to the left of the line Y—Y, no feedback is applied to the summing amplifier 12, i.e. the attenuator 20 has no output; when to the right, however, feedback proportional to the component $\omega_M'$ aligned with the vector $\omega_F$ is provided.

The torque which the field windings exert on the rotor of a synchronous motor is proportional to the magnitudes of the vectors $\omega_F$ and $\omega_R$ and the angle $\theta_S$ therebetween: for constant load, such torque should be constant. Therefore, when the vector $\omega_R$, for example, accelerates and causes the angle $\theta_S$ to decrease, the vector $\omega_F$ must be modified either in amplitude or rotational speed in order to keep the torque on the rotor constant. In FIG. 4, "a," "b," and "c" designate respectively the proper, too small, and too large angular displacements $\theta_S$ between the vectors $\omega_F$ and $\omega_R$ for a given load, i.e. the "b" and "c" situations are when the load respectively accelerates and decelerates.

The diagrams designated Form I show that when vector $\omega_R$ accelerates and causes the angle $\theta_S$ to decrease, the feedback vector $\omega_{fb}$ partially cancels the vector $\omega_F$, thereby further decreasing the torque developed and causing the vector $\omega_R$ to fall back to its proper position. On the other hand, when $\theta_S$ increases, the vector $\omega_{fb}$ adds to the vector $\omega_F$ causing the torque exerted to be further increased, i.e. the vector $\omega_R$ is pulled toward the vector $\omega_F$ to decrease the angle $\theta_S$. Form I of the invention is provided by the apparatus of FIG. 1, when the switch 10 is in the position shown and the attenuator 20 operates to reduce the amplitude of the feedback signal.

With the switch 10 to FIG. 1 in its "1" position, Form II of the invention is provided, i.e. the output signal from the attenuator 20 is applied through a lag network 26 that causes the feedback vector $\omega_{fb}$ to be rotated 90° counter to its direction of rotation. By causing the feedback vector $\omega_{fb}$ to be rotated so, the following action takes place when the rotor hunts: when the vector $\omega_R$ accelerates toward the vector $\omega_F$ and causes the angle $\theta_S$ to decrease, the feedback vector causes a resultant vector $\omega_F'$ to be produced with an angle $\theta_S'$ between it and the vector $\omega_R$. As a result, the torque developed decreases further and causes the vector $\omega_R$ to cease accelerating. Likewise, when the vector $\omega_R$ starts to decelerate, the feedback vector causes a resultant vector $\omega_F'$ to be produced (which has an increased angular relationship $\theta_S'$ between it and the vector $\omega_R$) which increases the torque on the vector $\omega_R$ pulling it ahead. This form of the invention is presently preferred because it tends to keep the voltage applied to the motor, i.e. the voltage represented by the resultant vector $\omega_F'$, substantially constant whereas Form I, herebefore described, has a tendency to produce larger variations in such applied voltage.

With the switch 10 of FIG. 1 in its position "2," the attenuator 20 output signal is applied through a lead network 28 which rotates the feedback vector $\omega_{fb}$ 90° in its direction of rotation to provide Form III of the invention. With this form, the torque and current are held substantially constant, but the vector $\omega_R$ is allowed to hunt in undamped manner, such being accomplished by causing the vector $\omega_F'$, i.e. the resultant vector representing the motor excitation, to accelerate and decelerate along with the vector $\omega_R$.

In the presently preferred form of the invention, the attenuator 20 of FIG. 1 is an integrator, e.g. the integrater shown and described in Radiation Laboratory Series, Massachusetts Institute of Technology, page 614, McGraw-Hill Book Company, New York, which cooperates with the capacitor 22 to provide both lead and lag qualities, i.e. torque change anticipation and attenuation respectively. The capacitor 22 instantly produces an output signal that depends on the rate that the detector 18 output signal changes; however, such capacitor output signal is instantly damped by the integrator as shown in FIG. 5.

The vector additions performed by Forms I, II and III of the invention require that the vector $\omega_F$, i.e. the output of the amplifier 12 of FIG. 1, be stabilized in amplitude and phase, such stability being provided by a hereindescribed special form of feedback. Referring then to FIG. 6, an amplifier 12' adapted to receive (the) regulated A.C. signals applies its output signals simultaneously to a phase detector 30, a multiplier 32 and a multiplier 34, the multiplier 34 receiving its applied signals through a 90° phase shift device 36. The phase detector 30, having a reference A.C. signal applied to it, has no output signal so long as the amplifier 12' output signal has the same phase as the reference signal, i.e. the phase detector output signal represents the angular differences between the phases of its two applied signals. The phase detector 30 output signal is applied to a resolving circuit 37 that provides signals representing the cosine and sine of the detected "angle" signal, such signals being applied respectively to the multipliers 32 and 34. Each multiplier 32 and 34 then has its output signal applied to the amplifier 12'.

Assuming no phase shift, the circuit of FIG. 6 operates like a conventional negative feedback amplifier circuit, this being because cos $\phi$ is 1 (making Loop 1 active) whereas sin $\phi$ is zero (making Loop 2 inactive, i.e. the multiplier 34 has no output signal).

With a phase shift, however (see vector B of FIG. 7), the phase detector produces an output signal representative thereof and, as a result, sine and cosine signals, both of finite magnitude, are applied to the multipliers 32 and 34. Since Loop 2 has a 90° phase shift device therein, a quadrature feedback signal, e.g. vector A of FIG. 7, is produced, such signal having a magnitude that varies as a function of the sine signal applied to the multiplier 34. The effect of adding the vectors A and B is to cause the amplifier to produce a resultant signal having constant phase. For small phase shifts of the vector B, the restoring vector A is small; for large phase shifts, the restoring vector A is substantial.

FIG. 8 combines the teachings embodied in the apparatus of FIG. 1 (with the switch 10 in position "1") and the apparatus of FIG. 6, the combination of FIG. 8 being adapted to drive the gyroscope of a floated gyroscope apparatus 38. As shown in FIG. 11, the gyroscope apparatus 38 contains a gyroscope 69 and a three-phase synchronous motor 70 each leg of which is excited by a lead from a Scott T circuit 39, e.g. the circuit shown and described in Standard Handbook for Electrical Engineers, A. E. Knowlton, McGraw-Hill Book Company, New York, pages 6–104. The Scott T connection receives two phase-power derived from separate sources 40 and 42, the circuit 40 being identical to the circuit 42 and each being adapted to receive D.C. signals at input terminals 44 and 46 respectively. The signal applied at terminal 46 is applied to a summing circuit 48, the output signal of which is applied to a modulator 50. An amplifier 52 receiving the modulator 50 output signal applies its output signal to the Scott T circuit 39 and also to demodulators 54 and 56. The demodulator 54 applies its output signal to the summing circuit 48 and the demodulator 56 applies its output signal to a summing circuit 58. A modulator 60 receives the output signal from the summing circuit 58; the modulator 60 and demodulator 56 have their reference signals shifted 90° with respect to the reference signals applied to the demodulator 54 and modulator 50. The amplifier 52 receives the modulator 60 output signal. In the apparatus shown in FIG. 11, the gyroscope 69 is housed by means including a fluid tight receptacle 71. Furthermore, the receptacle 71 floats in a fluid means 72 contained in a binnacle 73 in partially immersed condition.

Connected in series with one of the Scott T 39 output leads is a small resistor 62. A rectifier 64, rectifying the voltage developed across the resistor 62, applies its pulsating D.C. output signals through a large capacitor 68 to an integrator 66. The integrator 66 output signals are applied to the summing circuit 58 of each source circuit 40 and 42.

The circuit 42 provides the functions embodied in the apparatus of FIG. 6 and can be described best with reference to FIG. 9. With no phase shift provided by the amplifier 52, the amplifier 52 has the output signal shown by diagram A of FIG. 9. The demodulator 54 then provides the output signal shown by diagram B, this signal being applied to the summing circuit 48. After modulation of the summing circuit 48 D.C. output signal (by the modulator 50), the signal applied to the amplifier 52 is like that shown in diagram C, i.e. the amplifier 52 input and output signals are of the same phase. At this time the demodulator 56 has an output signal like that shown in diagram D, this being because the demodulator 56 has the phase of its reference signal shifted by 90°. Accordingly, the D.C. output signal from the summing circuit 58, after modulation by the modulator 60, disappears as shown by diagram E. When, however, the amplifier 52 starts to provide a phase shift to its input signal, the modulator 60 starts to provide a quadrature output signal that vectorially adds (see FIG. 7) to the modulator 50 output signal to cause the amplifier 52 resultant output signal to have an invariant phase.

By applying the integrator 66 output signal to the summing circuit 58, instead of to the summing circuit 48, Form II of the invention is provided. Now, when the resistor 62 current varies (due to variations in the angular relationships between the field and rotor vectors depicted on the gyroscope apparatus 38), the rectifier 64 produces a varying pulsating D.C. signal, the variations of which are applied in feedback through the integrator 66 to cancel the signals derived from the terminals 44 and 46. Hence, the angular relationship of vectors remains constant, as does the current passing through the gyro motor field windings.

With the apparatus of FIG. 8 functioning properly, all periodic variations in field winding current are eventually cancelled. Motor bearing noise however, being nonperiodic and within the normal range of frequencies damped by the apparatus of FIG. 8, causes representative voltage variations to be developed across the resistor 62. Therefore, by connecting the recorder of FIG. 10 (which may be a curve drawing instrument employing a continuous chart driven relative to a pen, e.g. the recorder described in paragraph 230 of Standard Handbook for Electrical Engineers) to point Q of FIG. 8, a plot of bearing noise vs. time will be provided, the area bounded by such plot being indicative of the quality of the bearings.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A synchronous motor excitation circuit comprising means providing alternating excitation voltages, summing means, means operable with a field winding of said motor to produce an alternating voltage representative of an alternating current component in that winding having a frequency substantially less than the frequency of the excitation voltages, and means attenuating the current component representative voltage, said attenuated voltage being applied to said summing means together with one of said excitation voltages to produce a resultant voltage that varies when the field winding impedances vary to keep the current drawn by the motor substantially invariant, said summing means resultant voltage being applied to excite said motor.

2. Apparatus for maintaining the current drawn by a synchronous motor substantially constant comprising means providing regulated exciting alternating voltages, a synchronous motor the field windings of which are each adapted to have an alternating voltage applied thereto, means operable with a field winding detecting a component of the alternating current that passes through that winding having a frequency substantially less than the frequency of said alternating voltage, said current detecting means producing an alternating voltage representative of said alternating current component, means attenuating said last named voltage, and means adding said attenuated voltage to at least one of said exciting voltages to produce a resultant alternating voltage, said resultant alternating voltage being applied to a motor field winding and being such that the torque which it causes to be exerted on the rotor of said motor varies when the impedances of said field windings vary to keep the current drawn by the motor substantially constant.

3. A synchronous motor excitation circuit comprising means providing alternating excitation voltages, summing means, means operable with a field winding of said motor to produce an alternating voltage representative of an alternating current component in that winding having a frequency substantially less than the frequency of the excitation voltages, and means attenuating the current component representative voltage, said attenuated voltage being applied to said summing means together with one of said excitation voltages to produce a resultant voltage that increases and decreases when the field winding impedances increase and decrease respectively, said summing means resultant voltage being applied to excite said motor.

4. Apparatus for maintaining the current drawn by a synchronous motor substantially constant comprising means providing regulated exciting alternating voltages, a synchronous motor the field windings of which are each adapted to have an alternating voltage applied thereto, means operable with a field winding detecting a component of the alternating current that passes through that winding having a frequency substantially less than the frequency of said alternating voltage, said current detecting means producing an alternating voltage representative of said alternating current component, means attenuating said last-named voltage, and means adding said attenuated voltage to at least one of said exciting voltages to produce a resultant alternating voltage, said resultant alternating voltage being applied to a motor field winding and being such that the torque which it causes to be exerted on the rotor of said motor increases and decreases respectively when the impedances of said field windings increase and decrease.

5. Apparatus for controlling hunting in a synchronous motor comprising means providing alternating excitation voltages, summing means, means operable with a field winding of said motor to produce an alternating voltage representative of an alternating current component in that winding having a frequency substantially less than the frequency of the excitation voltages, and means attenuating the current component representative voltage, said attenuated voltage being applied to said summing means approximately 180° out of phase with one of said excitation voltages to produce a resultant voltage that increases and decreases when the field winding impedances increase and decrease respectively, said summing means resultant voltage being applied to excite said motor.

6. Synchronous motor control apparatus that prevents undamped oscillations of a load driven by said motor comprising means providing alternating excitation voltages, summing means, means operable with a field winding of said motor to produce an alternating voltage representative of an alternating current component in that winding having a frequency substantially less than the frequency of the excitation voltages, and means attenuting the current component representative voltage, lag means providing an output alternating signal that has a phase shift of approximately 90 degrees relative to its applied alternating signals adapted to receive said attenuating means output signal, said lag means applying its output signal to said summing means together with one of said excitation voltages to produce a resultant voltage that varies when the field winding impedances vary, said summing means resultant voltage being applied to excite said motor.

7. A synchronous motor excitation circuit comprising means providing alternating excitation voltages, summing means, means operable with a field winding of said motor to produce an alternating voltage representative of an alternating current component in that winding having a frequency substantially less than the frequency of the excitation voltages, and means integrating the current component representative voltage, said integrated voltage being applied to said summing means together with one of said excitation voltages to produce a resultant voltage that varies when the field winding impedances vary, said summing means resultant voltage being applied to excite said motor.

8. Floated gyroscope apparatus comprising means housing a gyroscope, fluid means suspending said housing therein, synchronous motor means driving said gyroscope and means operable to excited said synchronous motor means comprising means providing alternating excitation voltages, summing means, means operable with a field winding of said motor to produce an alternating voltage representative of an alternating current component in that winding having a frequency substantially less than the frequency of the excitation voltages, and means attenuating the current component representative voltage, said attenuated voltage being applied to said summing means together with one of said excitation voltages to produce a resultant voltage that varies when the field winding impedances vary to keep the current drawn by the motor substantially constant, said summing means resultant voltage being applied to excite said motor whereby the fluid temperature is substantially unaffected by the current drawn because the motor field winding impedances are prevented from varying.

9. Floated gyroscope apparatus comprising:
(a) a gyroscope,
(b) means housing said gyroscope,
(c) fluid means buoyantly supporting said gyroscope housing,
(d) a synchronous motor adapted to drive said gyroscope, and
(e) means for exciting said synchronous motor comprising:
  (1) means providing alternating excitation voltages,
  (2) amplifier means,
  (3) means detecting modulation of the current in the field winding of said motor and producing an alternating voltage representative thereof,
  (4) and means attenuating the voltage representative of said current,
said attenuated voltage and one of said excitation voltages being applied simultaneously to said amplifier means to produce a resultant voltage that varies when the motor field winding impedances vary to keep the current drawn by the motor substantially constant, said amplifier means comprising:
(a) an amplifier adapted to have said resultant voltage applied thereto,
(b) means producing a first feedback voltage that varies in amplitude as a function of the cosine of the phase angular difference between the voltages applied to and at the output of the amplifier,
(c) means producing a second feedback voltage that varies in amplitude as a function of the sine of the phase angular difference between the voltages applied to and at the output of the amplifier phase shifted by approximately ninety degrees with respect to the first feedback voltage, said phase shifted feedback voltage having one sense when the amplifier provides a phase shift in one direction and an opposite sense when the amplifier provides a phase shift in the opposite direction, and
(d) means adapted to sum both feedback voltages and said resultant voltage, whereby the amplifier amplifies said resultant voltage by a substantially constant amount while keeping the phase of its output voltage substantially constant also.

10. Floated gyroscope apparatus comprising:
(a) a gyroscope,
(b) means housing said gyroscope,
(c) fluid means buoyantly supporting said gyroscope housing,
(d) a synchronous motor for driving said gyroscope, and
(e) means for exciting said synchronous motor comprising:
  (1) means providing alternating excitation voltages,
  (2) amplifier means,
  (3) means detecting modulation of the current in the field winding of said motor and producing an alternating voltage representative thereof,
  (4) and means integrating the voltage representative of said current,
said integrated voltage and one of said excitation voltages being applied simultaneously to said amplifier means to produce a resultant voltage that increases and decreases when the motor field winding impedances increase and decrease, said amplifier means comprising:
(a) an amplifier adapted to have said resultant voltage applied thereto,
(b) means producing a first feedback voltage that varies in amplitude as a function of the cosine of the phase angular difference between the voltages applied to and at the output of the amplifier,
(c) means producing a second feedback voltage that varies in amplitude as a function of the sine of the phase angular difference between the voltages applied to and at the output of the amplifier phase shifted by approximately ninety degrees with respect to the first feedback voltage, said phase shifted feedback voltage having one sense when the amplifier provides a phase shift in one direction and an opposite sense when the amplifier provides a phase shift in the opposite direction, and
(d) means adapted to sum both feedback voltages and said resultant voltage, whereby the amplifier amplifies said resultant voltage by a substantially constant amount while keeping the phase of its output voltage substantially constant also.

References Cited by the Examiner
UNITED STATES PATENTS

| | | | |
|---|---|---|---|
| 1,923,754 | 8/1933 | Seeley | 318—180 |
| 2,260,046 | 10/1941 | Moyer | 318—180 |
| 2,415,405 | 2/1947 | Barney | 318—184 |
| 2,682,366 | 6/1954 | Burgett | 235—193 |
| 3,023,604 | 3/1962 | Gordon | 73—9 |
| 3,027,749 | 4/1962 | Bernard | 73—9 |
| 3,055,588 | 9/1962 | Ratz | 235—193 |

ORIS L. RADER, *Primary Examiner.*